(12) United States Patent
Sikhivahan

(10) Patent No.: US 11,438,258 B2
(45) Date of Patent: Sep. 6, 2022

(54) EFFICIENT METHOD FOR COMPUTING BACKUP ROUTES

(71) Applicant: Telefonaktiebolaget LM Ericsson (publ), Stockholm (SE)

(72) Inventor: Gundu Sikhivahan, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/292,525

(22) PCT Filed: Nov. 13, 2018

(86) PCT No.: PCT/IN2018/050743
§ 371 (c)(1),
(2) Date: May 10, 2021

(87) PCT Pub. No.: WO2020/100151
PCT Pub. Date: May 22, 2020

(65) Prior Publication Data
US 2021/0399979 A1 Dec. 23, 2021

(51) Int. Cl.
*H04L 45/00* (2022.01)
*H04L 45/02* (2022.01)
(Continued)

(52) U.S. Cl.
CPC .............. *H04L 45/22* (2013.01); *H04L 45/02* (2013.01); *H04L 45/122* (2013.01);
(Continued)

(58) Field of Classification Search
CPC ....... H04L 45/22; H04L 45/02; H04L 45/122; H04L 45/123; H04L 45/24; H04L 45/28; H04L 45/18; G06F 15/16
See application file for complete search history.

(56) References Cited

U.S. PATENT DOCUMENTS 7,876,672 B2   1/2011  Chao et al.
8,861,340 B1 * 10/2014  Atlas ...................... H04L 45/22
                                                370/227
(Continued)

OTHER PUBLICATIONS

Bryant, S. et al., "Remote Loop-Free Alternate (LFA) Fast Reroute (FRR)", Internet Engineering Task Force (IETF); Request for Comments: 7490; Category: Standards Track, Apr. 2015, pp. 1-29, Vinci Systems.

(Continued)

*Primary Examiner* — Jimmy H Tran
(74) *Attorney, Agent, or Firm* — Coats & Bennett, PLLC

(57) ABSTRACT

A method implemented by a source router reduces the number of SPF computations needed to compute TI-LFA backup paths. Rather than naively perform a backup path computation for all destinations, the source router identifies those destinations affected by that link or node failure and performs backup path computations only for the affected destinations. For the remaining destinations (i.e., those for which a backup path is required), the backup path computations are performed in a breath-first order relative to a subtree rooted at the node incident to the failed link (in the case of a link failure) or at the protected node (in the case of a node failure). The breath-first order further reduces the number of computations required by taking advantage of earlier backup path computations.

20 Claims, 12 Drawing Sheets

(51) Int. Cl.
   *H04L 45/122* (2022.01)
   *H04L 45/12* (2022.01)
   *H04L 45/24* (2022.01)
   *H04L 45/28* (2022.01)
(52) U.S. Cl.
   CPC ............ *H04L 45/123* (2013.01); *H04L 45/24* (2013.01); *H04L 45/28* (2013.01)

(56) References Cited

U.S. PATENT DOCUMENTS

| | | | |
|---|---|---|---|
| 9,100,328 B1* | 8/2015 | Atlas | H04L 45/28 |
| 9,571,387 B1* | 2/2017 | Atlas | H04L 12/1877 |
| 9,838,246 B1 | 12/2017 | Hegde et al. | |
| 9,853,854 B1* | 12/2017 | Sarkar | H04L 45/28 |
| 2005/0078610 A1* | 4/2005 | Previdi | H04L 45/18 370/254 |
| 2005/0265228 A1* | 12/2005 | Fredette | H04L 45/00 370/216 |
| 2006/0087965 A1* | 4/2006 | Shand | H04L 45/22 370/218 |
| 2006/0153067 A1* | 7/2006 | Vasseur | H04L 47/825 370/242 |
| 2006/0187819 A1* | 8/2006 | Bryant | H04L 41/0668 370/216 |
| 2006/0268682 A1* | 11/2006 | Vasseur | H04L 45/22 370/242 |
| 2007/0019646 A1* | 1/2007 | Bryant | H04L 45/48 370/390 |
| 2007/0038767 A1* | 2/2007 | Miles | H04L 45/22 709/230 |
| 2007/0091794 A1* | 4/2007 | Filsfils | H04L 12/66 370/228 |
| 2008/0062861 A1* | 3/2008 | Shand | H04L 45/04 370/242 |
| 2008/0130491 A1* | 6/2008 | Chao | H04L 45/22 370/225 |
| 2008/0232347 A1* | 9/2008 | Chao | H04L 45/50 370/351 |
| 2010/0157794 A1* | 6/2010 | Nakash | H04L 45/22 370/228 |
| 2010/0315943 A1* | 12/2010 | Chao | H04L 41/0893 370/221 |
| 2012/0218884 A1* | 8/2012 | Kini | H04L 45/507 370/228 |
| 2012/0275298 A1* | 11/2012 | Bryant | H04L 45/22 370/225 |
| 2013/0051217 A1* | 2/2013 | So | H04L 45/18 370/217 |
| 2013/0107698 A1* | 5/2013 | Bejerano | H04L 45/122 370/218 |
| 2013/0301470 A1* | 11/2013 | Thu | H04L 45/02 370/254 |
| 2013/0336116 A1* | 12/2013 | Vasseur | H04L 47/825 370/235 |
| 2014/0233422 A1* | 8/2014 | Thu | H04L 45/16 370/254 |
| 2015/0016242 A1* | 1/2015 | Ernstrom | H04L 45/48 370/218 |
| 2015/0244615 A1* | 8/2015 | Esale | H04L 45/507 370/389 |
| 2015/0249597 A1* | 9/2015 | Atlas | H04L 45/50 370/218 |
| 2015/0271056 A1* | 9/2015 | Chunduri | H04L 45/02 370/238 |
| 2015/0312138 A1* | 10/2015 | Thu | H04L 45/18 370/255 |
| 2015/0350062 A1* | 12/2015 | Lindem, III | H04L 45/18 370/220 |
| 2015/0365271 A1* | 12/2015 | Chunduri | H04L 45/18 370/216 |
| 2015/0381406 A1* | 12/2015 | Francois | H04L 45/28 370/218 |
| 2016/0072664 A1* | 3/2016 | Lindem, III | H04L 45/122 370/219 |
| 2016/0218965 A1* | 7/2016 | Thu | H04L 45/507 |
| 2017/0093695 A1* | 3/2017 | Kebler | H04L 67/22 |
| 2018/0123869 A1* | 5/2018 | Singh | H04L 41/0654 |
| 2018/0302318 A1* | 10/2018 | Yi | H04L 12/4633 |

OTHER PUBLICATIONS

Sarkar, P. et al., "Remote-LFA Node Protection and Manageability", Internet Engineering Task Force (IETF); Request for Comments: 8102; Category: Standards Track, Mar. 2017, pp. 1-22.

Atlas, A. et al., "Basic Specification for IP Fast Reroute: Loop-Free Alternates", Network Working Group; Request for Comments: 5286; Category: Standards Track, Sep. 2008, pp. 1-31, Alcatel-Lucent.

Bashandy, A. et al., "Topology Independent Fast Reroute using Segment Routing draft-bashandy-rtgwg-segment-routing-ti-lfa-01", Network Working Group; Internet Draft; Intended status: Standards Track, Jul. 17, 2017, pp. 1-12.

Ho, K. et al., "Optimizing Post-Failure Network Performance for IP Fast Reroute using Tunnels", Proceedings of the 5th International ICST Conference on Heterogeneous Networking for Quality, Reliability, Security and Robustness, Jul. 28, 2008, pp. 1-7, Article No. 44.

Yoshihiro, T. et al., "Single Node Protection without Bouncing in IP Networks", IEEE 13th International Conference on High Performance Switching and Routing, Jun. 24, 2012, pp. 88-95.

* cited by examiner

INITIAL ROUTING TABLE

| PREFIX | NEXT HOP | LAST HOP | DISTANCE |
|---|---|---|---|
| P1 | A | A | 3 |
| P2 | A | B | 6 |
| P3 | H | C | 6 |
| P4 | H | D | 5 |
| P5 | H | E | 5 |
| P6 | H | F | 4 |
| P7 | H | G | 4 |
| P8 | H | H | 3 |

*FIG. 4A*

NEW ROUTING TABLE

| PREFIX | NEXT HOP | LAST HOP | DISTANCE |
|---|---|---|---|
| P1 | A | A | 3 |
| P2 | A | B | 6 |
| P3 | A | C | 36 |
| P4 | A | D | 37 |
| P5 | A | E | 37 |
| P6 | A | F | 38 |
| P7 | A | G | 38 |
| P8 | A | H | 39 |

*FIG. 4B*

EFFICIENT METHOD FOR COMPUTING BACKUP ROUTES

TECHNICAL FIELD

The disclosure relates generally to fast re-routing in a packet-switched communication network and, more particularly, to the computation of backup paths for fast re-routing.

BACKGROUND

In a typical packet-switched network, such as an Internet Protocol (IP) network or Multi-Protocol Label Switching (MPLS)/Label Distribution Protocol (LDP) network, each network node, e.g. router or switch, computes a shortest path to each destination and uses the shortest path for routing in non-failure conditions. The routes or paths to each destination in the network are stored in a routing table. When a link or another node attached to an IP router fails, a routing table is computed based on the new network topology. Computation of the new routing table can take between hundreds of milliseconds to a few seconds. If the previous routing table is used until the new routing table is computes, packets going through the failed link/node would be lost, potentially causing service disruption.

Fast Rerouting (FRR) solutions provide protection against link or node failures by computing in advance alternate routes, also called backup routes, that can be activated instantly when a link or node failure occurs. Initially, the source router is using a primary path (PATH-1) to a destination. When a link/node fails, it switches to a backup path (PATH-B) while it re-computes routing tables. Traffic is routed over the backup path while the new routing table is computed thereby avoiding traffic loss. When the new table has been computed, the router switches to a new primary path (PATH-2).

One requirement for a viable backup path is that it should be "loop-free", i.e., packets must be able to reach the destination without looping between nodes. Loop-free alternatives (LFAs) avoid traffic loss by sending traffic to a neighboring node that can forward the traffic to destination without looping back to source. Remote LFAs can be used if a LFA does not exist. RLFAs use LDP tunnels to tunnel traffic to a non-neighbor "release node" from which the traffic can forwarded to the destination without looping back to the source. The Internet Engineering Task Force (IETF) describes high-level algorithms to compute Loop-Free Alternates (LFA, RFC5286) and Remote Loop-Free Alternates (RLFA, RFC7490, RFC 8102). RLFA and TILFA derive backup paths by computing the intersection of extended P-Space and Q-Space.

Another technique called Topology-Independent LFA (TI-LFA, proposed IETF standard) is used in segment routing networks to provide loop-free backup paths. TI-LFA differs from RLFA by constraining the backup-path computation problem to require that, topologically, the backup path (PATH-B) must be the same as the primary path after the router re-converges following a link/node failure (PATH-2). In the pre-convergence scenario, it is PATH-1 that is loop-free, not PATH-2. So overlay tunnels must be built on the (physical) PATH-2 to convert it to the (logical) PATH-B. The conventional approach for backup path computation, known as the "per-prefix" or "per-destination" approach, requires that a backup path be computed for all destinations known to the router. A drawback of this approach is that a shortest path first (SPF) computation is performed for each backup path computation. The SPF computation is the most computationally intensive part of calculating routing tables in link-state routing protocols. Thus, the "per-prefix" or "per-destination" approach is inefficient and processor intensive.

SUMMARY

The present disclosure relates generally to backup path computations for fast re-routing in IP networks. The techniques described in the present disclosure reduce the number of computations needed to compute TI-LFA backup paths by reducing the set of destinations for which it must be computed, recognizing destinations for which TI-LFA does not need to be computed or has already been computed. The techniques described herein reduce the number of Q-space computations that need to be performed, each of which requires a SPF computation. Rather than naively perform a backup path computation for all destination, embodiments of the present disclosure identify those destination affected by that link or node failure and perform backup path computations only for the affected destinations. For the remaining destinations (i.e., those for which a backup path is required), the backup path computations are performed in a breath-first order relative to a subtree rooted at the node incident to the failed link (in the case of a link failure) or at the protected node (in the case of a node failure). The breath-first order eliminates the need for SPF computations for some destinations by taking advantage of earlier SPF computations.

One aspect of the disclosure comprises methods of fast re-routing implemented by a source router in a communication network. The source router determines a set of affected destinations in a new network topology based on the assumed failure of a protected link or protected node in an initial network topology. The source router further determines a set of exit nodes in the new network topology associated with the affected destinations. The source router iteratively computes, in a breath-first order relative to a Q-space rooted at a node incident to the failed link or at the protected node, backup paths for affected destinations associated with primary exit nodes in the set of exit nodes while skipping backup path computations for intermediate exit nodes in the set of exit nodes.

Another aspect of the disclosure comprises a router in a packet-switched communication network including a packet forwarding unit and a routing unit. The packet forwarding unit is configured to receive packets over the packet-switched communication network and to forward the received packets toward a respective destination. The routing unit is configured to iteratively compute, in a breath-first order relative to a subtree rooted at a node incident to the failed link or at the protected node, backup paths for affected destinations associated with primary exit nodes in the set of exit nodes while skipping backup path computations for intermediate exit nodes in the set of exit nodes.

Another aspect of the disclosure comprises a computer program product for a router in a packet-switched communication network. The computer program product comprises program instructions that when executed by a processor in a router, causes the router to determine a set of affected destinations in a new network topology based on the assumed failure of a protected link or protected node in an initial network topology, determine a set of exit nodes in the new network topology associated with the affected destinations, and iteratively compute, in a breath-first order relative to a Q-space rooted at a node incident to the failed link or at the protected node, backup paths for affected destinations associated with primary exit nodes in the set of exit nodes while skipping backup path computations for intermediate exit nodes in the set of exit nodes. The computer program product may be in a carrier, such as a non-transitory computer readable medium.

BRIEF DESCRIPTION OF THE FIGURES

FIG. 4A illustrates an extended P-space of router S.

FIG. 4B illustrates the Q-space of router H.

DETAILED DESCRIPTION

Figure 1:
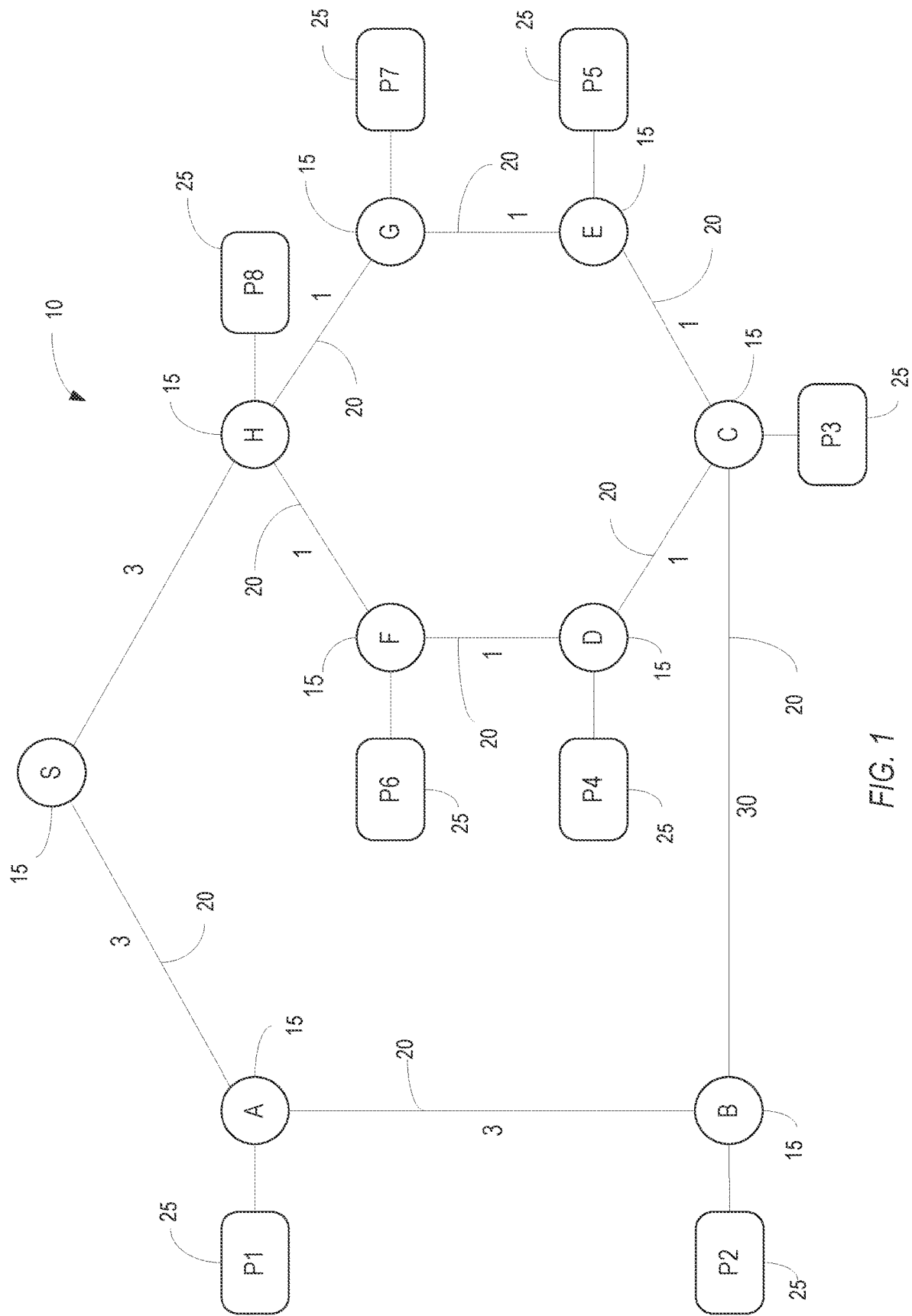
FIG. 1 illustrates an exemplary network in a pre-failure condition.

Referring now to the drawings, FIG. 1 illustrates an exemplary communication network 10 which is used for purposes of explanation. The communication network 10 comprises a plurality of routers 15 interconnected by links 20. The routers 15 are indicated individually by letters A-H and S, where S represents the source router. Links are denoted individually by reference to the nodes at each end of the link. For example, the link between source router S and router H is referred to as Link S-H. Routers A-H connect to respective destinations 25, which are denoted individually as Destinations P1-P8. The numbers adjacent each link 20 represent the cost associated with the link for use in shortest path computations.

Figure 2:
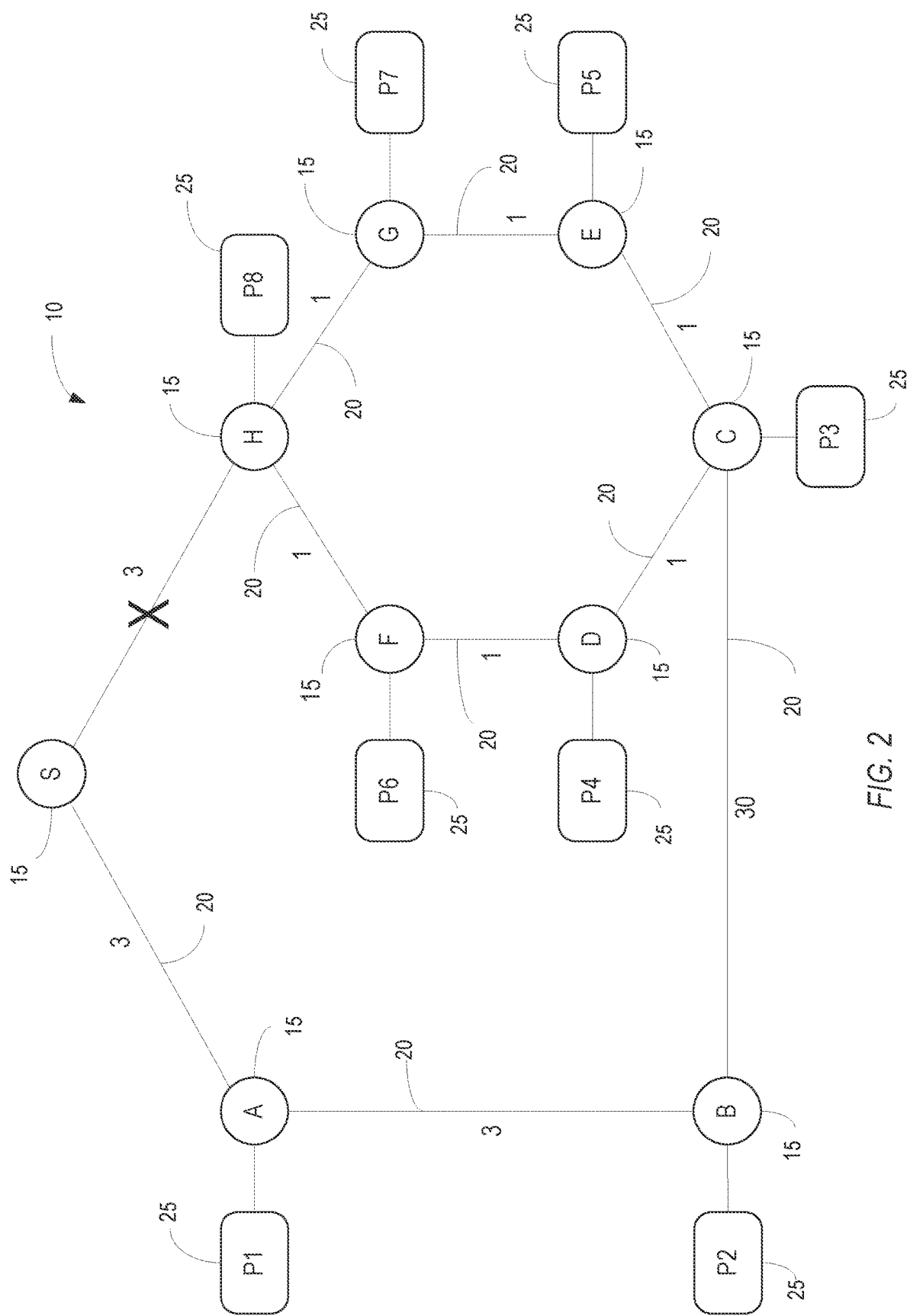
FIG. 2 illustrates the exemplary network with a link failure on the link to router H

FIG. 2 illustrates the same communication network 10 as shown in FIG. 1 following a failure of link S-H between router S and router H. When the link S-H fails, the source router S temporarily switches to a backup path while it re-computes routing tables. Traffic is routed over a backup path (PATH-B) while the new routing table is computed thereby avoiding traffic loss. When the new routing table has been computed, the router switches to the new primary path (PATH-2). One requirement for a viable backup path is that it should be "loop-free", i.e., packets must be able to reach the destination without looping between nodes.

TI-LFA is one commonly used technique for computing backup paths to protect against link or node failures. TI-LFA constrains the backup-path computation problem by mandating that topologically, the backup path (PATH-B) must be the same as that would be used as primary path (PATH-2) after the router re-converges following a link/node failure. PATH-2, however, cannot be directly used as a backup path before re-convergence, because it would cause packets to loop. For this reason, a logical path of tunnels is overlaid on PATH-2 to convert it to a logical backup path (PATH-B). A drawback of TI-LFA is the computational complexity of the backup path computations. A shortest path first (SPF) computation is performed for each backup path computation. The SPF computation is the most computationally intensive part of calculating routing tables in link-state routing protocols.

The present disclosure reduces the number of SPF computations needed to compute TI-LFA backup paths by reducing the set of destinations for which a backup path must be computed, recognizing destinations for which TI-LFA does not need to be computed or has already been computed. It reduces the number of Q-space computations that need to be performed, each of which requires a SPF computation. Rather than naively perform a backup path computation for all destination, embodiments of the present disclosure identify those destination affected by that link or node failure and perform backup path computations only for the affected destinations. For the remaining destinations (i.e., those for which a backup path is required), the backup path computations are performed in a breath-first order relative to a Q-space rooted at the node incident to the failed link (in the case of a link failure) or at the protected node (in the case of a node failure). The breath-first order eliminates the need for SPF computations for some destinations by recognizing that the backup paths for some destinations will be the same and taking advantage of earlier SPF computations. In effect, the breath-first order allows some destinations to inherit backup paths previously computed for other destinations.

Conventionally, the shortest-path routing table computed by a link-state protocol using Dijkstra's Single-Source Shortest Path algorithm generates two pieces of information for every destination in the network, captured as the pair {Prefix, NextHop}. Prefix encodes the destination network as an IPAddress/Mask-Length, and NextHop refers to the neighbor node that the source sends the packet to on its way to the destination associated with Prefix. According to an aspect of the present disclosure, the exit node associated with each destination is also captured, converting the pair {Prefix, NextHop} to the triplet {Prefix, NextHop, LastHop}. LastHop is the last router on the shortest path from the source router to the destination. It is the router to which the destination is directly attached, referred to herein as the exit node. This enhancement does not require significant additional computer processing unit (CPU) cycles.

Figure 3B:
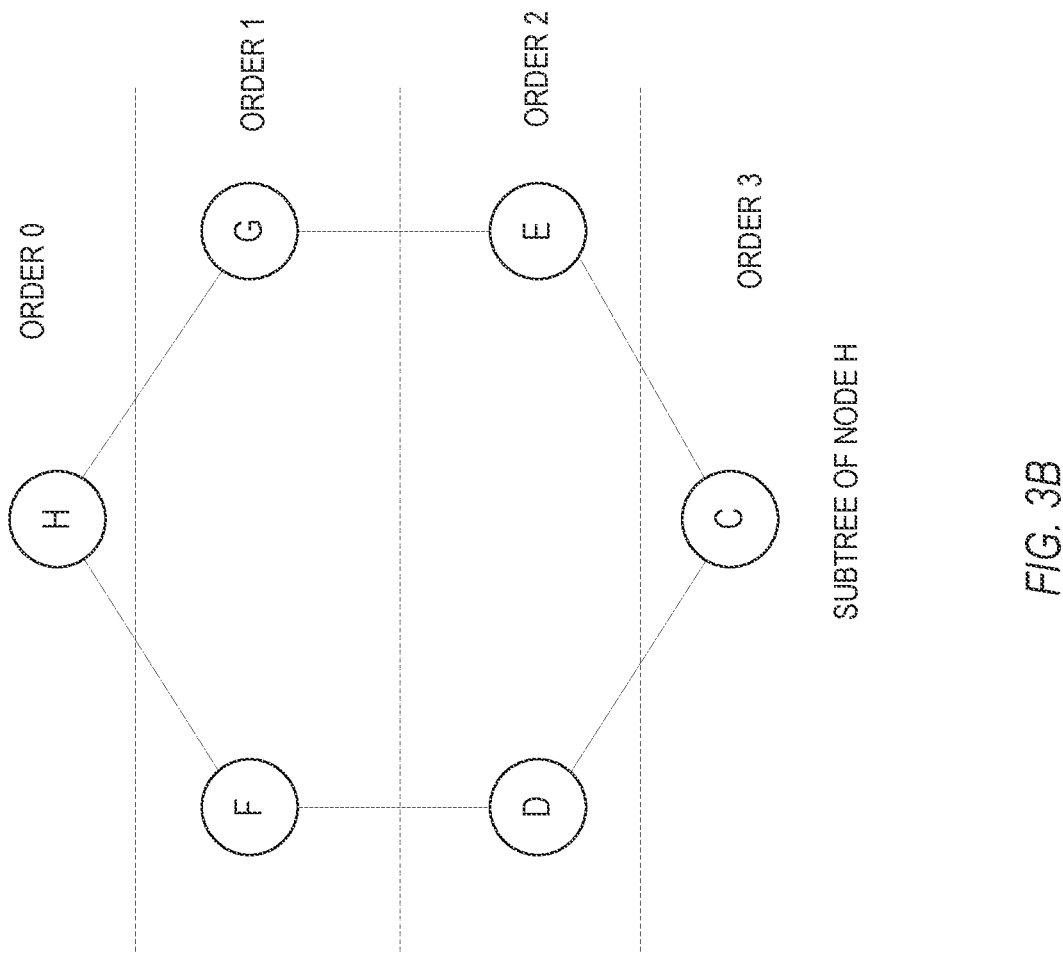
FIG. 3B illustrates the new routing table after convergence.
Figure 3A:
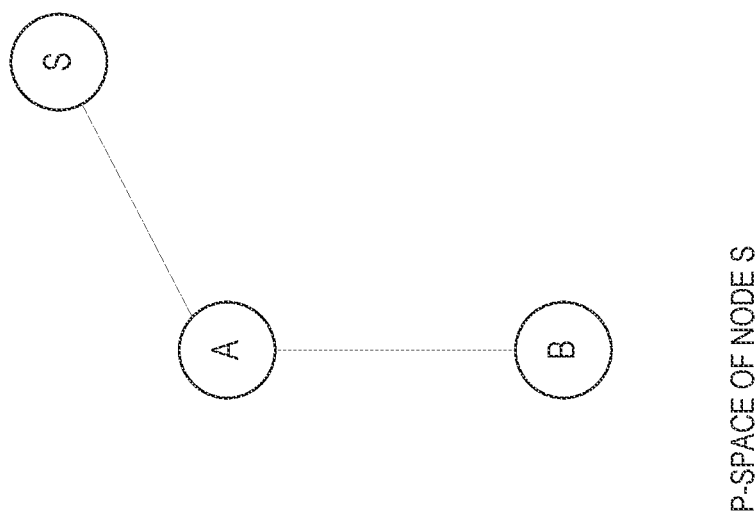
FIG. 3A illustrates the initial routing table prior to the link failure.

FIG. 3A shows an initial routing table for the network illustrated in FIG. 1. As shown in FIG. 3A, the initial routing table includes the Prefix, NextHop and LastHop for each destination 25. NextHop, as noted above, identifies the neighbor node 20 to which packets addressed to the destination associated with Prefix are forwarded. For example, NextHop for Destination P5 is router H. LastHop identifies the exit node to which the destination is attached. Using again as an example, the exit node is router E.

According to one aspect of the disclosure, a second routing table or SPF tree is generated premised on the assumption that a protected link or protected node has failed. FIG. 3B shows a post-convergence routing table for the communication network 10 assuming failure of Link S-H. As shown in FIG. 3B, the new routing table includes, for each destination 25, the Prefix, NextHop and LastHop assuming failure of Link S-H. As described in more detail below, the post-convergence routing table or SPF tree provides the physical routes on which the release nodes identified during backup path calculations must lie.

According to one aspect of the disclosure, the second routing table or SPF tree is used to determine the destinations affected by the link failure or node failure. Referring to FIGS. 3A and 3B, it is noted that NextHop for destinations P3-P8 is changed following the failure of Link S-H, while the NextHop for destinations P1-P2 remain the same. Destinations for which NextHop remains the same (e.g., P1 and P2) are unaffected by the link failure or node failure and do not require a backup path. As a first optimization, the backup path computations are not performed for the unaffected destinations. The remaining destinations (e.g. P3-P8) require a backup paths to protect against the link failure or node failure. These destinations are referred to herein as the affected destinations.

The backup path computations according to TI-LFA require an extended P-space computation and a Q-space computation. Conventionally, the backup paths for each destination are determined based on the extended P-space of the source router S and the Q-space of the exit node to which the affected destination is attached. One or two tunnels are overlaid on the physical path. Where the extended P-space and Q-space intersect, the release node comprises the PQ node (the node lying in both the extended P-space and the Q-space). In this case, packets are tunneled from the source router to the release node, from which packets can be forwarded to the destination without looping. When the extended P-space and the Q-space do not intersect, a PQ pair is identified. The Q-node in the PQ pair is the release node to which packets are tunneled from the source router S. A second tunnel is overlaid on the physical path from the P-node to the Q-node.

The computation of the extended P-space of the source router S assumes either link protection (i.e., incident link may fail) or node protection (a neighbor node may fail). The extended P-space is computed in a manner known in the art. The same extended P-Space applies to all affected destinations.

The Q-Space computation for an affected destination requires a SPF calculation and consumes significant CPU processing cycles. For large networks, the computations of the Q-space for the affected destinations can be onerous.

According to one aspect of the disclosure, a second optimization performs Q-space computations for the affected destinations iteratively in a breath-first order relative to a subtree rooted at a node incident to the failed link (in the case of link failure) or at the protected node (in the case of node failure). During each iteration, an exit node attached to an affected destination is selected and a Q-space computation is performed. The exit nodes for which Q-space computations are performed are referred to herein as primary exit nodes. After the Q-space computation is complete for a primary exit node, other nodes lying on the backup for the primary exit node, referred to herein as intermediate exit nodes, are identified. Q-space computations for the destinations attached to the intermediate exit nodes are not needed. Rather, the backup path computed for the destination attached to the primary exit node can be inherited by the affected destinations attached to the intermediate exit nodes. The Q-space computation for destinations attached to affected destinations continues as described above until a backup path is computed for each affected destination. Thus, computation of the Q-space is performed for destinations attached to primary nodes only while Q-space computations for destinations attached to the intermediate exit nodes is skipped, which greatly reduces the number of computations for the backup path calculations.

In one exemplary embodiment, the Q-space computations are performed by making a list of exit nodes associated with the affected destinations. In this example, the exit node list comprises nodes C through H. The exit nodes in the exit node list are processed in a breadth-first order relative to a subtree rooted at the node incident to a failed link or the protected node. The subtree in this example, shown in FIG. 4B, is rooted at node H. As used herein, the term "breadth-first order" means that the exit nodes are processed in an order according to the "level" of the exit node, where "level" is the distance from the root node of the subtree measured in number of hops. The root node is designated as a level 0 node. Level 1 nodes are the neighbors of the root node, Level 2 nodes are the neighbors of Level 1 nodes, and so forth. In the example given herein, node H is a Level 0 node or root node, routers F and G are Level 1 nodes, routers D and E are Level 2 nodes, and router C is a Level 3 node. Thus, in this example, a breadth-first order may comprise the order {H, F, G, D, E, C}. The order may be switched for nodes in the same level. Thus, the order {H, G, F, E, D, C} is also a breadth-first order. Q-space computation begin with the lowest level exit node in the exit node list and proceed in breath-first order (i.e. lowest level first). Where two or more exit nodes are at the same level, the source router S may the exit nodes at the same level in any order.

In one embodiment, the lowest order exit node or exit nodes are moved from the exit node list to a candidate node list. The candidate node list may be implemented as a first-in, first-out (FIFO) buffer. When an exit node is enqueued in the candidate node list, it is deleted from the exit node list. After the initialization of the candidate node list, the source router S selects the first entry in the candidate node list and computes the Q-space for the selected exit node. The first entry in the candidate node list is a primary exit node. Each time an entry in the candidate node list is selected, its neighbor nodes in the exit node list are enqueued in the candidate node list and deleted from the exit node list. After the Q-space is computed, the source router S, intersects the Q-space for the primary exit node with the extended P-space for the source node, and identifies the PQ-node, if any, or the PQ pair. The P and Q nodes are selected such that they lie on the post-convergence path to meet TI-LFA criterion. An entry is then made in a backup path list including the triple (LastHop, P-node, Q-node), where LastHop indicates the primary exit node. As described in more detail below, the Q-node will serve as the release node for the backup path. The intermediate exit nodes lying on the shortest path from the release node to the primary exit node, if present in the exit node list and/or candidate node list, inherit the backup path computed for the corresponding primary exit node. For each intermediate exit node, an entry is created in the backup path list including the triple {LastHop, P-node, Q-node}, where LastHop indicates the intermediate exit node. The intermediate exit nodes that inherit a backup path are deleted from the exit node list and candidate node list. After the intermediate exit nodes are processed, the next entry in the candidate node list is selected and the process as described above is repeated. Each time a candidate node is selected, its neighbor nodes in the exit node list are enqueued into the candidate node list and deleted from the exit node list. The Q-space computations are complete when the candidate node list and exit node list are empty.

The process of enqueuing entries into the candidate node list and deleting them from the exit node list effects a sorting of the exit nodes in a breadth-first order. Those skilled in the art will appreciate that the use of the candidate node list to effect sorting of the exit nodes is only one example implementation and that use of the candidate node list is not required. For example, in another embodiment, the entries in the exit node list could be sorted in a breadth-first order before the Q-space computations are started. In this case, the exit nodes could be selected in order directly from the exit node list.

Once the Q-space computations are completed, the source router S iterates through the destinations in its initial routing table and installs the computed backup path for each destination where LastHop in the initial routing table matches an entry in the backup table. The backup path comprises the triple {Prefix, Tunnel1, Tunnel}. Tunnel1 is a Segment-Routing segment from the source router S to the P-node or PQ-node. Tunnel2 is the second routing adjacency segment from the P-node to the Q-node where no PQ node exits. Tunnel2 is required only in the case of DLFA. In cases where a PQ node exists, Tunnel2 is either omitted or left null.

Performing the Q-space computations in breadth-first order while skipping Q-space computations for intermediate exit nodes greatly reduces the number of computations that need to be performed to compute the backup paths for all affected destinations. That is, the techniques herein described enable the source router S to skip Q-space computations for intermediate exit nodes. Instead, the intermediate exit nodes inherit the backup path previously computed for a primary exit node. For example, if X is the release node for destination D and if Y and Z are on the shortest path from X to D, then X is also the release node for Y and Z. Therefore, the Q-space computation does not need to be repeated for Y and Z. The breadth-first order of computations exploits this relationship.

Referring to FIG. 2, an example of the backup path computations is given where Link S-H has failed. Comparing the tables shown in FIGS. 3A and 3B, it is noted that NextHop is changed for the destinations associated with prefixes {P3, P4, P5, P6, P7, P8}. NextHop for destinations associated with destinations P1 and P2 are unchanged, meaning that these destinations are unaffected by the failure of Link S-H. As a first optimization, the source router S eliminates destinations P1 and P2 from the backup path computations. Having eliminated P1 and P2, the source router S generates a list of the exit nodes associated with the affected destinations. The affected destinations are {P3, P4, P5, P6, P7, P8} and the exit node list associated with the affected destinations comprises {C, D, E, F, G, and H}.

If the backup paths for are computed in the order given above, six Q-space computations will be required; one for each member of the list. The reduced complexity method described herein, in contrast, computes backup paths in the order suggested by a breadth-first traversal of the subtree rooted at H, effectively yielding the order {H, F, G, D, E, C}. The source router S initializes the candidate node list to the set {H} and deletes H from the exit node list. In this example, the candidate node list is initialized with only one node, so the source router S selects H to begin the Q-space computations. When H is selected, nodes F and G are enqueued in the candidate node list and deleted from the exit node list. The computed backup path is {LastHop=H, P-router=B, Q-router=C; via A}, which is entered into the backup path list. In this example, C is the release node.

After identifying the release node, the source router S identifies D-G as intermediate exit nodes lying on the shortest path from C to H. Because the release node will be the same for intermediate nodes C-G, Q-space computations for these nodes can be skipped. Therefore, backup paths are entered in the backup path list for these intermediate exit nodes using the same P-space and Q-space. The backup paths for routers C-G are:

{LastHop=G, P-router=B, Q-router=C; via A}
{LastHop=F, P-router=B, Q-router=C; via A}
{LastHop=E, P-router=B, Q-router=C; via A}
{LastHop=D, P-router=B, Q-router=C; via A}
{LastHop=C, P-router=B, Q-router=C; via A}

The source router S deletes intermediate nodes C-G from both the exit node list and the candidate node list. Because both lists are now empty, the process ends with only one Q-space computation being performed as opposed to six for the naïve order.

If H is "protected" instead of link S-H, then backup paths are computed assuming that H itself has failed. In this case candidate node list is initialized to the set of H's neighbors, i.e., the set {F, G}. After performing a Q-space computation for F, nodes D and C are identified as intermediate exit nodes and inherit the backup path computed for F. Nodes D and C are then deleted from the exit node list. Backup paths are still needed for G and E, so the source router S selects G from the candidate node list and performs a second Q-space computation for G. After performing a Q-space computation for G, node E is identified as intermediate exit node and inherits the backup path computed for G. This process results in two Q-space computations versus five in the naïve order.

Figure 5:
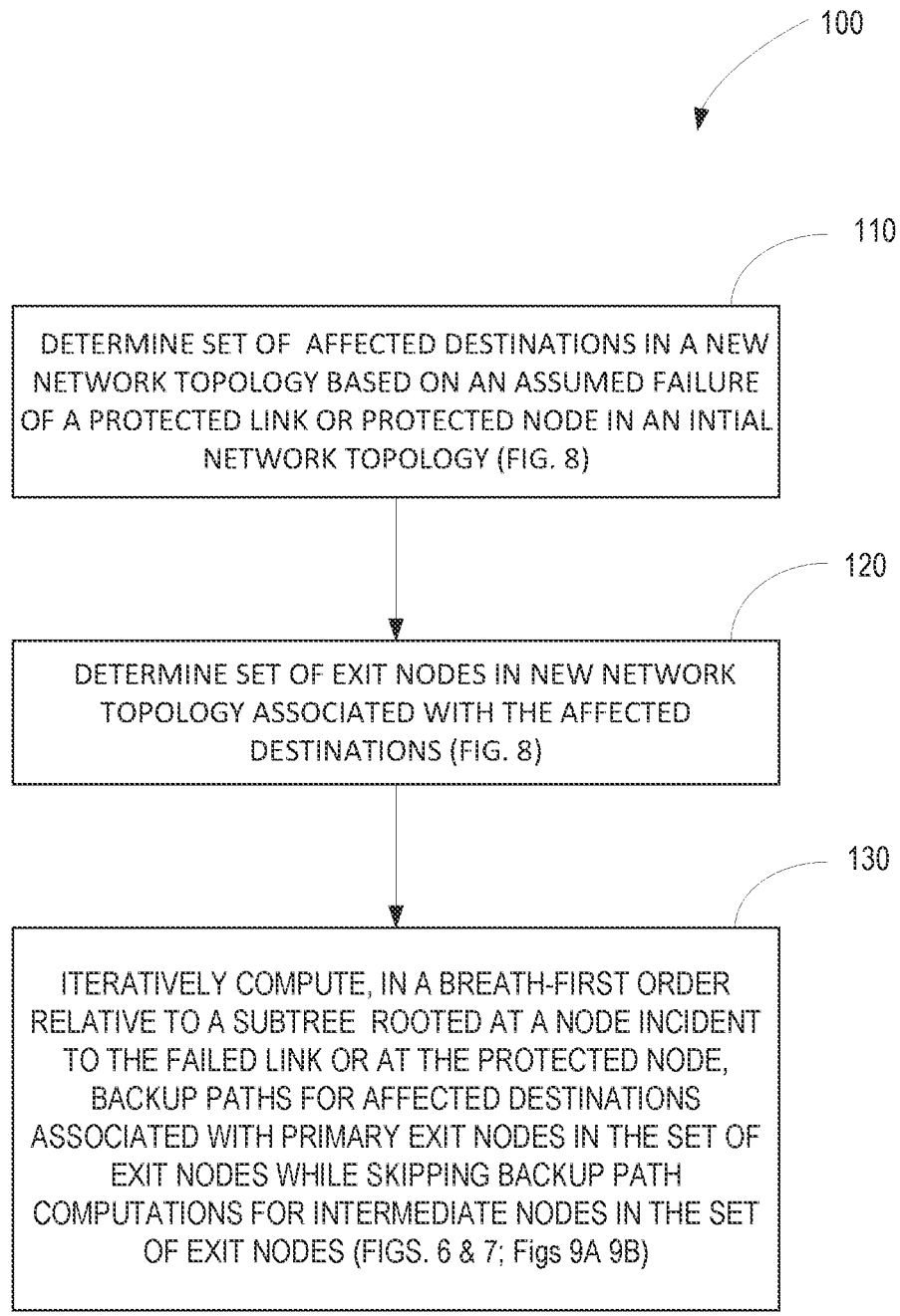
FIG. 5 illustrates an exemplary method for computing backup paths according to an embodiment.

FIG. 5 illustrates an exemplary method 100 implemented by a source router S according to one exemplary embodiment. The method 100 is used to compute backup paths for fast re-routing in the event of a link failure or node failure. The source router S initially determines a set of affected destinations in a new network topology based on an assumed failure of a protected link or protected node in an initial network topology (block 110). The affected destinations comprise the set of destinations where NextHop is changed. The source router S determines a set of exit nodes in the new network topology associated with the affected destinations (block 120). The set of exit nodes are identified by LastHop in the initial routing table. The source router S then iteratively computes, in a breadth-first order relative to a Q-space rooted at a node incident to the failed link or at the protected node, backup path for affected destinations associated with primary exit nodes in the set of exit nodes while skipping backup path computations for intermediate exit nodes in the set of exit nodes (block 130).

Figure 6:
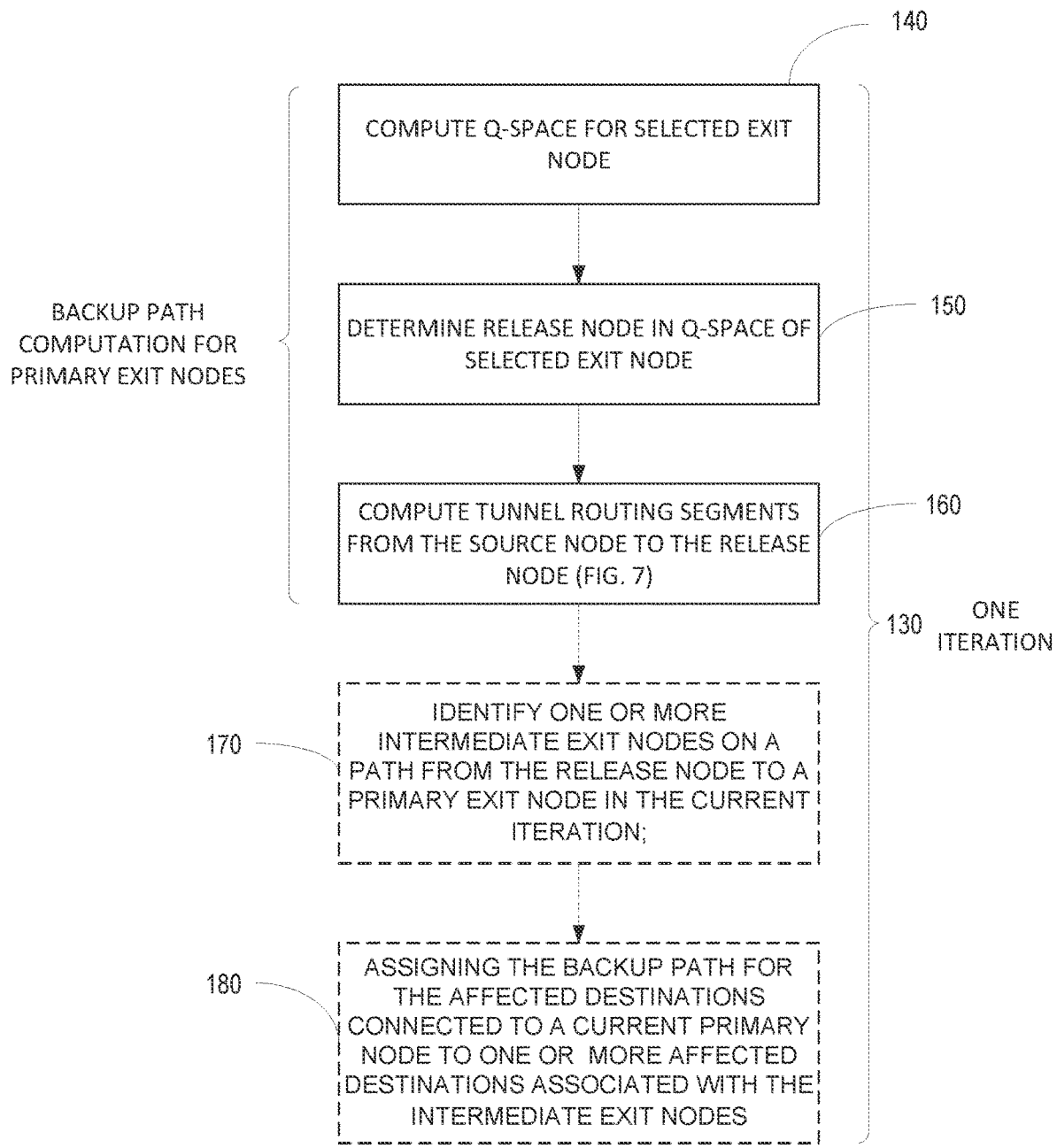
FIG. 6 illustrates one iteration of the backup path computation.

FIG. 6 illustrates one iteration in the backup path computations performed at block 130 in FIG. 5. The source router S computes a Q-space for a selected one of the primary exit nodes (block 140). The source router S then determines a release node for the selected exit node (block 150). Finally, the source router S computes tunnel routing segments from the source node to the release node (block 160).

In some iterations, one or more intermediate exit nodes may exist on the backup path from the release node and the primary exit node. The source router S identifies one or more intermediate exit nodes, if any, on a path from the release node to a primary exit node in the current iteration (block 170). The source router S assigns the backup path for the affected destinations connected to a current primary exit node to the one or more affected destinations associated with the intermediate exit nodes (block 180).

Figure 7:
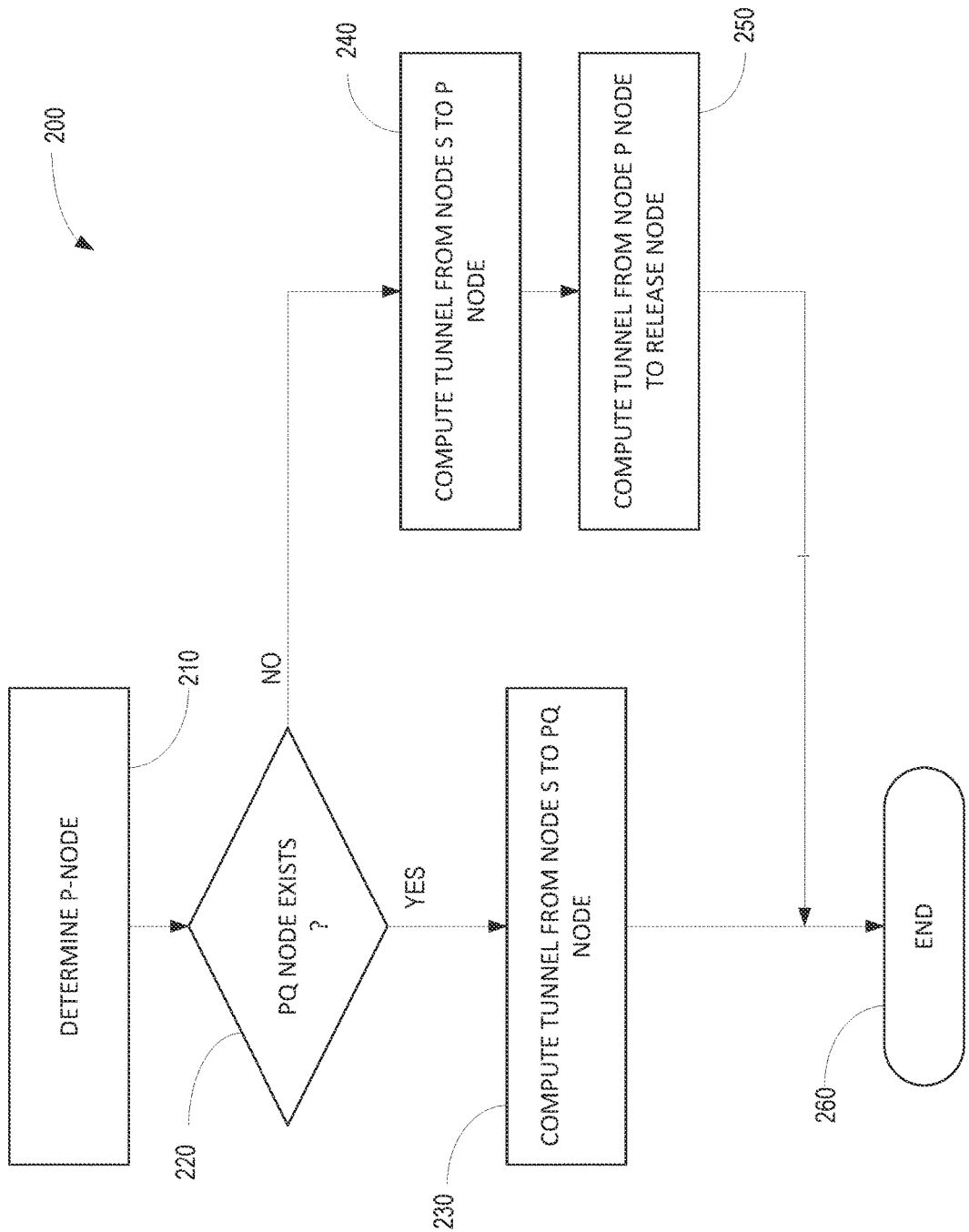
FIG. 7 illustrates a method of computing tunnel routing segments for a backup path.

FIG. 7 illustrates a method 200 for computing tunnel routing segments. The extended P-space of the source router S is determined and the P-node is identified (step 210). The extended P-space of the source router S is intersected with the Q-space of an exit node to determine whether a PQ-node exists (block 220). If so, and the source router S computes a tunnel from the source router S to the PQ-node (block 230). In this case, the PQ node is the release node and only one tunnel is required so the process ends (block 260). If the P-space and Q-space do not intersect so that no PQ-node exists, the source router S computes a tunnel from the source router S to the P-node (block 240). The source router S then computes a second tunnel from the P-node to the Q-node (block 250). In this case, the Q-node is the release node. The computed tunnels are installed as a backup for the destination associated with the exit node.

Figure 8:
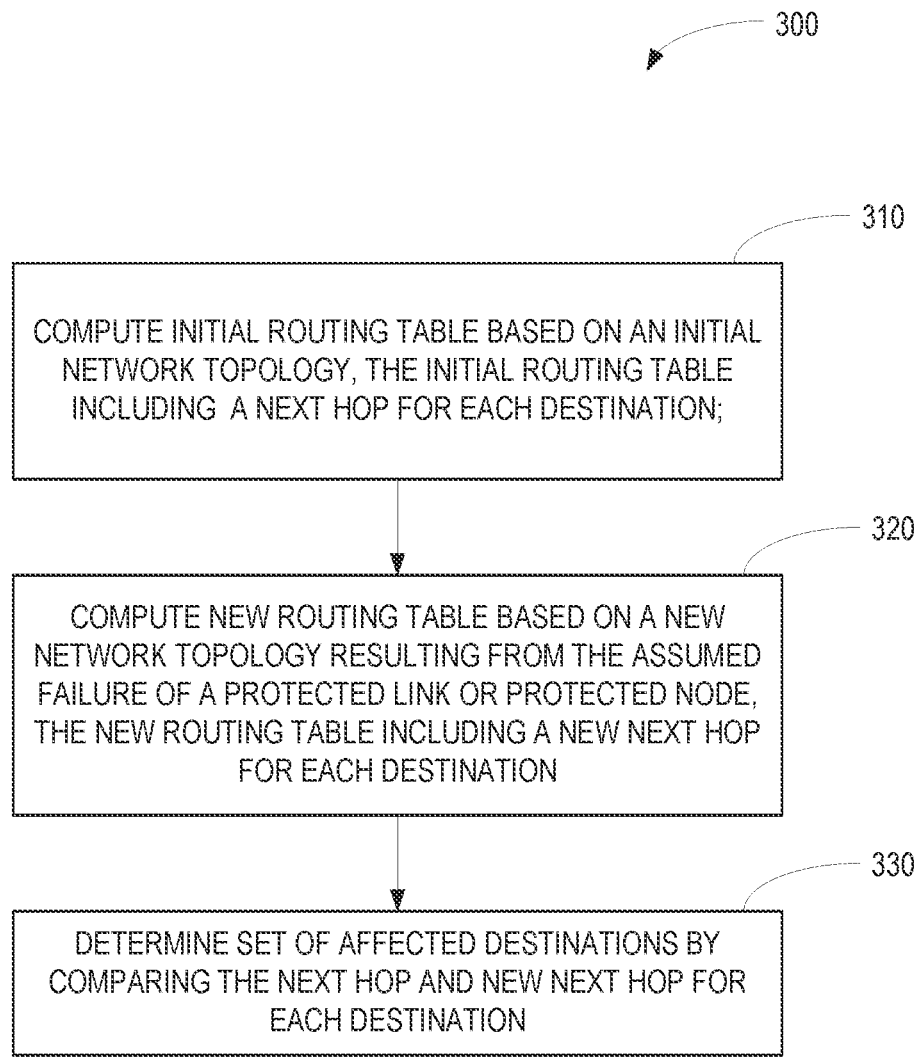
FIG. 8 illustrates a method for determining a set of affected destinations for which backup paths are needed.

FIG. 8 illustrates an exemplary method 300 for determining the set of affected destinations at block 210 in FIG. 5. The source router S computes an initial routing table based on an initial network topology (block 310). The initial routing table includes a NextHop for each destination. The source router S also computes a new routing table based on a new network topology resulting from an assumed failure of a protected link or protected node (block 320). The new routing table includes a new NextHop for each destination. The source router S determines the set of affected destinations by comparing the NextHop and new NextHop for each destination (block 330). The affected destinations comprise those destinations where the NextHop is changed.

Figure 9:
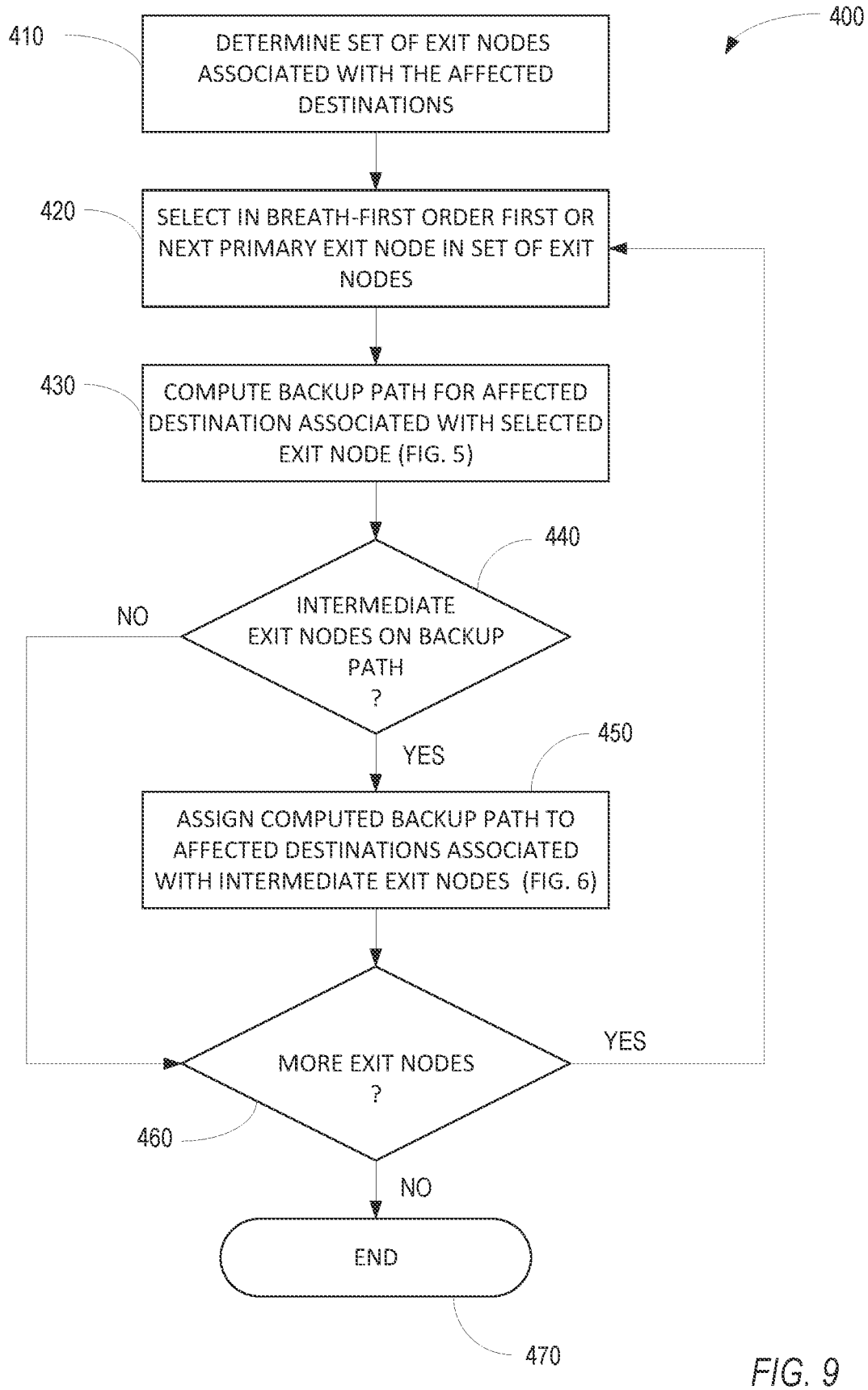
FIG. 9 illustrates another method for computing backup paths according to an embodiment.

FIG. 9 illustrate another method 400 performed by the source router S for computing backup paths according to the TI-LFA criterion. The source router S determines a set of exit nodes associated with affected destinations as previously described (block 410). After defining the set of exit nodes for the affected destinations, the source router S begins the backup path computations (block 420-460). As previously noted, the source router S iterates through the exit nodes associated with the affected destination S in a breath-first order relative to a subtree rooted at a node incident to the failed link or at the protected node. The source router S calculates a backup path for each primary exit node while skipping backup path calculations for intermediate exit nodes. In the first iteration of the backup path computations, the source router S selects, in a breath-first order, a first one of the primary exit nodes in the set of exit nodes (block 420). The source router S then computes the backup path for the affected destination associated with the selected exit node (block 430). The computation performed at block 430 involves a Q-space computation as previously described. Next, the source router S determines whether any intermediate exit nodes in the set of exit nodes are present on the just computer backup path from the release node to the exit node (block 440). If so, the source router S assigns the computed backup path for the selected exit node to the intermediate exit node (block 450). If not, the source router S determines whether there are any more exit nodes to process (block 460). At block 460, the source router determines whether any more exit nodes exists that have not been process (block 460). If so, processing returns to block 420 for the next iteration. Otherwise, the process ends (block 470).

During each subsequent iteration, the source router S selects, in breath-first order, the next primary exit node in the set of exit nodes (block 420). The selection of the exit nodes in the exit node list proceeds in a breadth-first order relative to a Q-space or subtree anchored at a node incident to the failed link, or at the protected node. During each iteration, the processing proceeds as shown in blocks 430-460. When all exit nodes have been processed, the process ends (block 470).

Figure 10A:
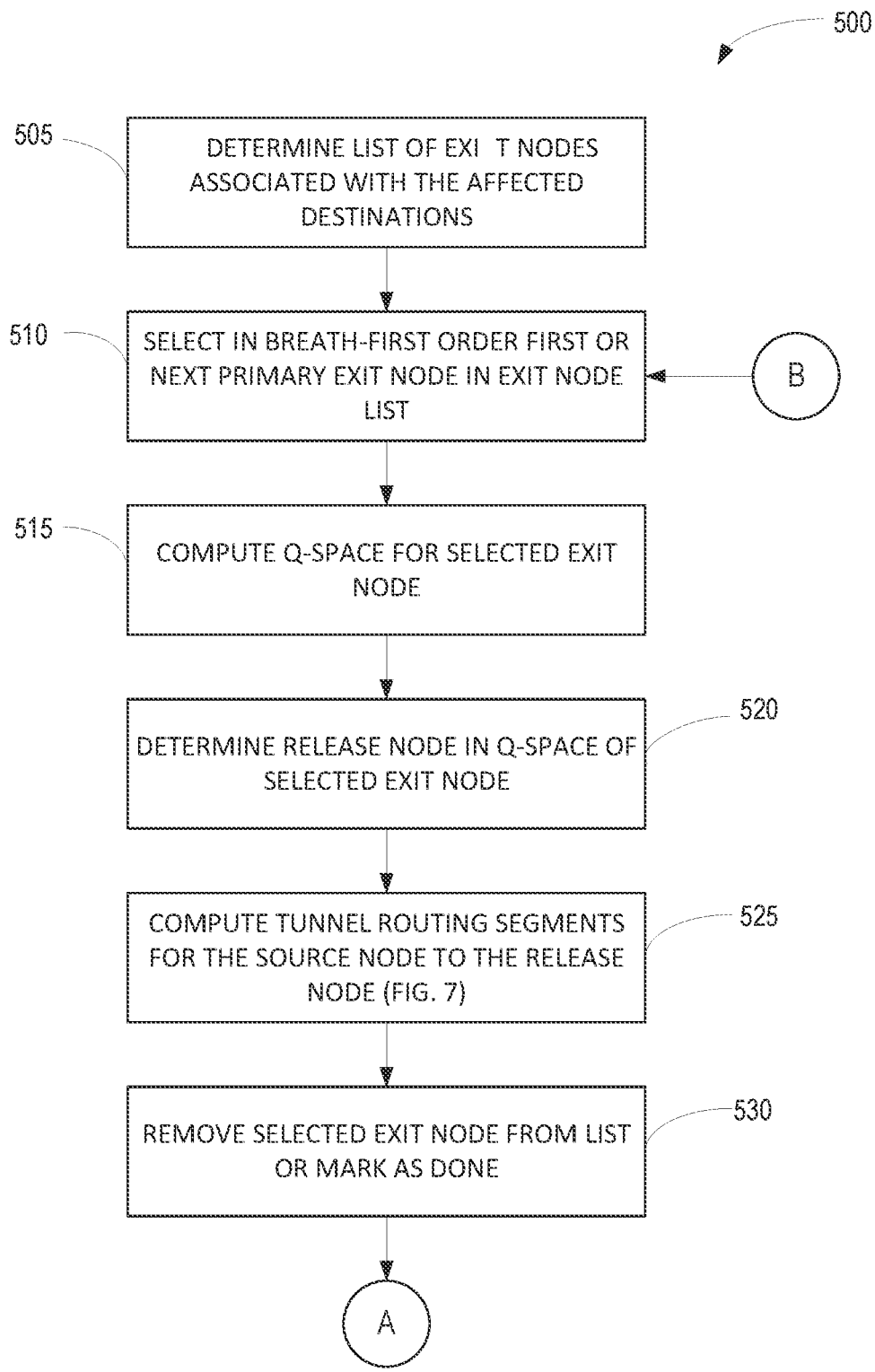
FIGS. 10A and 10B illustrate another method for computing backup paths according to an embodiment.
Figure 10B:
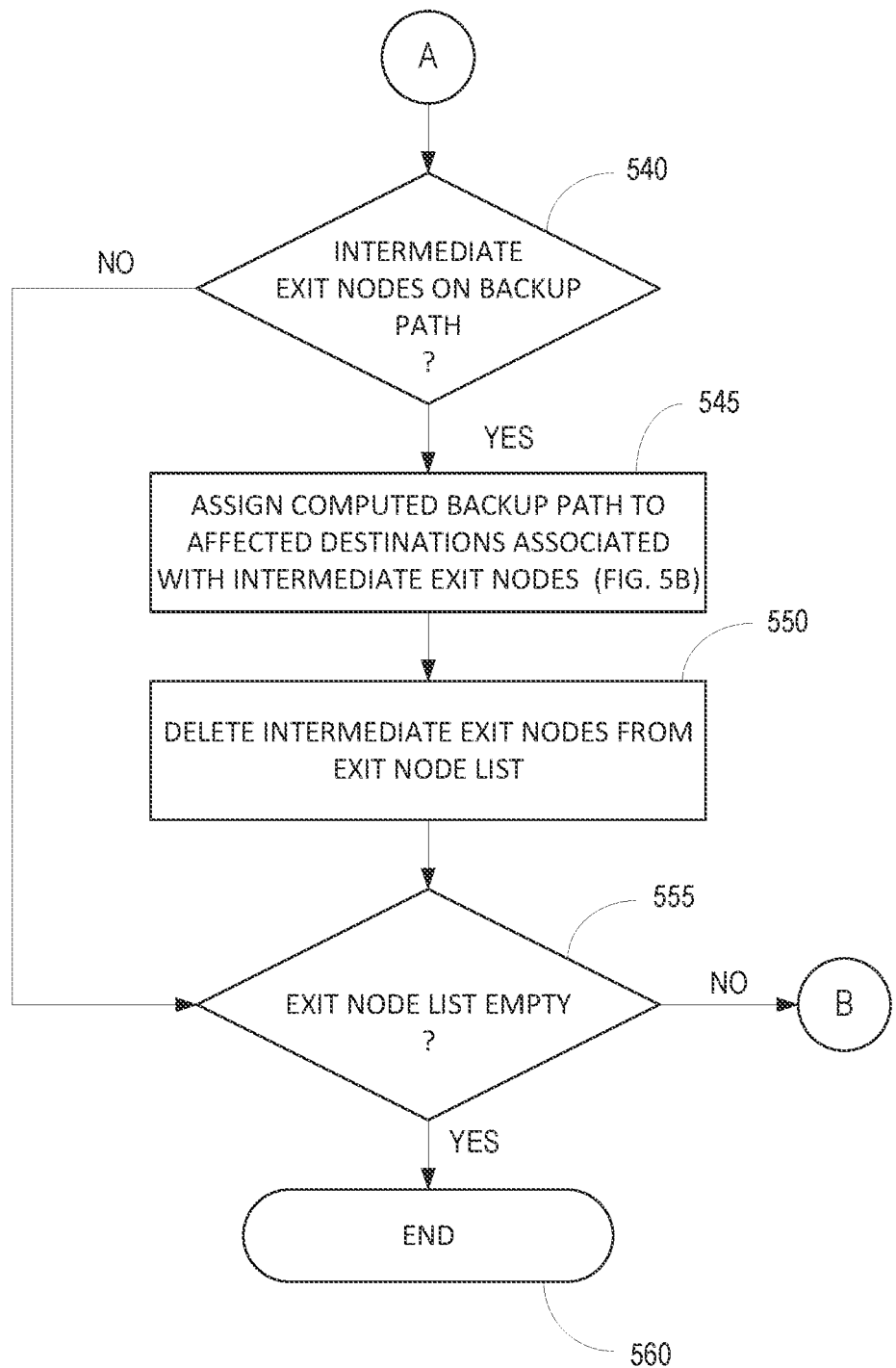

FIGS. 10A and 10B illustrate another method 500 performed by the source router S for computing backup paths according to the TI-LFA criterion. The source router S determines a set of exit nodes associated with affected destinations as previously described (block 505). After defining the set of exit nodes for the affected destinations, the source router S begins the backup path computations (block 510-555). As previously noted, the source router S iterates through the exit nodes associated with the affected destination S in a breath-first order relative to a subtree rooted at a node incident to the failed link or at the protected node. The source router S calculates a backup path for each primary exit node while skipping backup path calculations for intermediate exit nodes. In the first iteration of the backup path computations, the source router S selects the lowest order exit node for which a backup path is needed (block 510). The selected exit node will be a primary exit node. The source router S then computes the backup path for the affected destination associated with the selected exit node (block 515). The computation performed at block 515 involves a Q-space computation as previously described. The source router S determines the release node in the Q-space of the selected exit node and computes one or more tunnel routing segments from the source router S to the release node (block 520). The source router S removes the selected exit node from the exit node list (block 530). The deletion of the selected node can be done before or after the Q-space computation at block 515. Next, the source router S determines whether any intermediate exit nodes in the set of exit nodes are present on the just computed backup path from the release node to the selected exit node (block 540). If not, the source router S determines whether there are any more exit nodes to process (block 555). If so, processing returns to block 510 for the next iteration. If not, the process ends (block 560). If intermediate exit nodes exist on the computed backup path, the source router S assigns the same backup path to the intermediate exit nodes and deletes the intermediate exit nodes from the exit node list (blocks 545, 550). The source router S determines whether there are any more exit nodes to process (block 555). If so, processing returns to block 510 for the next iteration. If not, the process ends (block 560).

Figure 11:
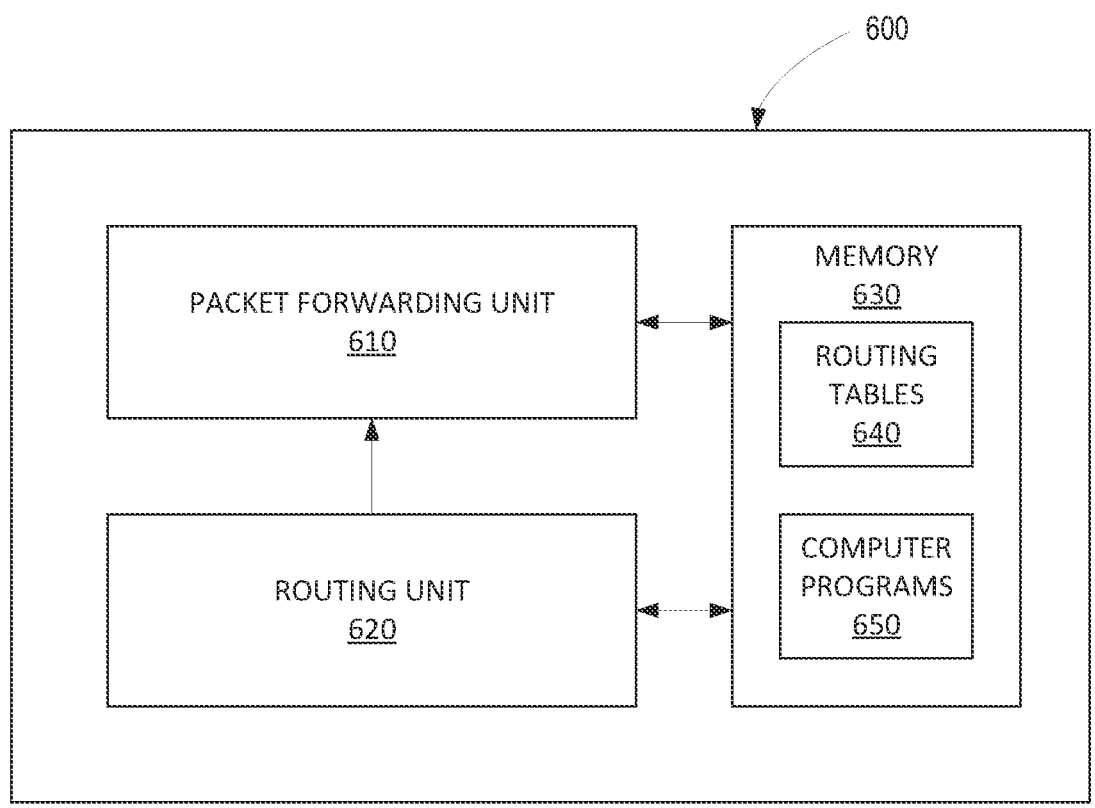
FIG. 11 illustrates an exemplary router according to an embodiment.

FIG. 11 illustrates an exemplary source router S indicated by the numeral 600. The source router S comprises a packet forwarding unit 610, a routing unit 620, and memory 630. The packet forwarding unit includes an interface 615 for receiving and forwarding packets. The packet forwarding unit includes a network interface 615 and related processing circuitry for receiving and forwarding packets. The routing unit 620 comprises processing circuitry to compute the routing tables that are used by the packet forwarding unit 610 to forward packets. The routing unit 620 is configured in one embodiment to perform the methods shown in FIGS. 5-9. The processing circuitry for the packet forwarding unit 610 and routing unit 620 may, for example, comprise one or more microprocessors, hardware circuits, application-specific integrated circuits (ASICs), filed programmable gate arrays (FPGAs), or a combination thereof. The packet forwarding unit 610 and routing unit 620 may share processing resources. In some embodiments, the functions of the packet forwarding unit 610 and routing unit 620 may be implemented by a single microprocessor. In other embodiments, the functions of the packet forwarding unit 610 and routing unit 620 may be implemented by different microprocessors.

Memory 630 stores routing tables 640 used by the packet forwarding unit 610 to receive and forward packets and computer programs 660 to configure the packet forwarding unit 610 and routing unit 620. The computer programs 660 may comprise a packet forwarding program executed by the packet forwarding unit 610 to receive and forward packets, and a routing program executed by the routing unit 620 to compute the backup paths as herein described.

The techniques described herein reduce the number of computations needed to compute TI-LFA backup path. Reducing the number of computations will in turn reduce the amount of time and hardware resource needed to perform the backup path computations.

The invention claimed is:

1. A method of fast re-routing implemented by a source router in a communication network, the method comprising:
   determining a set of affected destinations in a new network topology based on the assumed failure of a protected link or protected node in an initial network topology;
   determining a set of exit nodes in the new network topology associated with the affected destinations; and
   iteratively computing, in a breadth-first order relative to a subtree rooted at a node incident to the failed link or at the protected node, backup paths for affected destinations associated with primary exit nodes in the set of exit nodes while skipping backup path computations for intermediate exit nodes in the set of exit nodes.

2. The method of claim 1, wherein iteratively computing the backup paths for the affected destinations associated with the primary exit nodes comprises, for each iteration:
   computing a Q-space rooted at the primary exit node associated with the affected destination;
   determining a release node in the Q-space of the primary exit node for the affected destination; and
   computing one or more tunnel routing segments from the source node to the release node for the affected destination.

3. The method of claim 2, wherein computing the one or more tunnel routing segments from the source node to the release node comprises:
   computing a P-space of the source router;
   determining a P-node in the P-space of the source router; and
   computing a first tunnel routing segment from the source router to the P-node.

4. The method of claim 3, wherein, for one or more affected destinations, the P-node is the same as the release node and only one tunnel routing segment is computed.

5. The method of claim 3, wherein computing the one or more tunnel routing segments from the source node to the release node further comprises, for one or more affected destinations computing a second tunnel routing segment from the P-node to the release node for the affected destination.

6. The method of claim 1, further comprising, for one or more iterations:
   identifying one or more intermediate exit nodes on a path from the release node to a primary exit node in the current iteration; and
   assigning the backup path for the affected destinations connected to a current primary node to one or more affected destinations associated with the intermediate exit nodes.

7. The method of claim 1, wherein determining the set of affected destinations based on the assumed failure of a protected link or protected node comprises:
   computing an initial routing table based on the initial network topology, the first routing table including a next hop for each destination;
   computing a new routing table based on the new network topology resulting from the assumed failure of a protected link or protected node, the second routing table including a new next hop for each destination; and
   determining the set of affected destinations by comparing the next hop and new next hop for each destination.

8. The method of claim 7:
   wherein the initial routing table further includes a last hop indicating an exit node in the initial network topology for each destination; and
   wherein the new routing table further includes a new last hop indicating an exit node in the new network topology for each destination.

9. A router in a packet-switched communication network, the router comprising:
   packet forwarding circuitry configured to receive packets over the packet-switched communication network, and forward the received packets toward a respective destination; and
   routing circuitry configured to compute forwarding instructions for the packet forwarding circuitry, the routing circuitry being operative to:
      determine a set of affected destinations in a new network topology based on the assumed failure of a protected link or protected node in an initial network topology;
      determine a set of exit nodes in the new network topology associated with the affected destinations; and
      iteratively compute, in a breadth-first order relative to a subtree rooted at a node incident to the failed link or at the protected node, backup paths for affected destinations associated with primary exit nodes in the set of exit nodes while skipping backup path computations for intermediate exit nodes in the set of exit nodes.

10. The router of claim 9, wherein the packet routing circuitry is configured to iteratively compute the backup paths for the affected destinations associated with the primary exit nodes by, for each iteration:
    computing a Q-space rooted at the primary exit node associated with the affected destination;
    determining a release node in the Q-space of the primary exit node for the affected destination; and
    computing one or more tunnel routing segments from the source node to the release node for the affected destination.

11. The router of claim 10, wherein the packet routing circuitry is configured to compute the one or more tunnel routing segments from the source node to the release node by:
    computing a P-space of the source router;
    determining a P-node in the P-space of the source router; and
    computing a first tunnel routing segment from the source router to the P-node.

12. The router of claim 11, wherein the packet routing circuitry is configured to compute a single tunnel routing segment for one or more affected destinations where the P-node is the same as the release node.

13. The router of claim 11, wherein the packet routing circuitry is configured to compute a second tunnel routing segment from the P-node to the release node for the affected destination for one or more of the affected destination where the P-node and the release node are different.

14. The router of claim 9, wherein the packet routing circuitry is further configured to, for one or more iterations:
    identify one or more intermediate exit nodes on a path from the release node to a primary exit node in the current iteration; and assign the backup path for the affected destinations connected to a current primary node to one or more affected destinations associated with the intermediate exit nodes.

15. The router of claim 9, wherein the packet routing circuitry is configured to determine a set of affected destinations based on the assumed failure of a protected link or protected node by:
   computing an initial routing table based on the initial network topology, the first routing table including a plurality of destinations based on a current network topology, the routing table including a next hop for each destination;
   computing new routing table based on the new network topology resulting from the assumed failure of a protected link or protected node, the second routing table including a new next hop for each destination; and
   determining the set of affected destinations by comparing the next hop and new next hop for each destination.

16. The router of claim 15:
   wherein the initial routing table further includes a last hop indicating an exit node in the initial network topology for each destination; and
   wherein the new routing table further includes a new last hop indicating an exit node in the new network topology for each destination.

17. A router in a packet-switched communication network configured to:
   processing circuitry;
   memory containing instructions executable by the processing circuitry whereby the router is operative to:
      determine a set of affected destinations in a new network topology based on the assumed failure of a protected link or protected node in an initial network topology;
      determine a set of exit nodes in the new network topology associated with the affected destinations; and
      iteratively compute, in a breadth-first order relative to a Q-space rooted at a node incident to the failed link or at the protected node, backup paths for affected destinations associated with primary exit nodes in the set of exit nodes while skipping backup path computations for intermediate exit nodes in the set of exit nodes.

18. The router of claim 17, wherein the instructions are such that the router is operative to iteratively compute the backup paths for the affected destinations associated with the primary exit nodes by, for each iteration:
   computing a Q-space rooted at the primary exit node associated with the affected destination;
   determining a release node in the Q-space of the primary exit node for the affected destination; and
   computing one or more tunnel routing segments from the source node to the release node for the affected destination.

19. The router of claim 17, wherein the instructions are such that the router is operative to, for one or more iterations:
   identify one or more intermediate exit nodes on a path from the release node to a primary exit node in the current iteration; and
   assign the backup path for the affected destinations connected to a current primary node to one or more affected destinations associated with the intermediate exit nodes.

20. A non-transitory computer readable recording medium storing a computer program product for controlling a router for fast re-routing in a communication network, the computer program product comprising program instructions which, when run on processing circuitry of the router, causes the router to:
   determine a set of affected destinations in a new network topology based on the assumed failure of a protected link or protected node in an initial network topology;
   determine a set of exit nodes in the new network topology associated with the affected destinations; and
   iteratively compute, in a breadth-first order relative to a subtree rooted at a node incident to the failed link or at the protected node, backup paths for affected destinations associated with primary exit nodes in the set of exit nodes while skipping backup path computations for intermediate exit nodes in the set of exit nodes.

* * * * *